US012394380B2

(12) United States Patent
Ma et al.

(10) Patent No.: US 12,394,380 B2
(45) Date of Patent: Aug. 19, 2025

(54) DISPLAY DEVICE, DISPLAY SYSTEM AND DISTRIBUTED FUNCTION SYSTEM

(71) Applicant: Wuhan China Star Optoelectronics Technology Co., Ltd., Hubei (CN)

(72) Inventors: Changwen Ma, Hubei (CN); Guowei Zha, Hubei (CN); Guanghui Liu, Hubei (CN); Zhifu Li, Hubei (CN); Xiaolin Yan, Hubei (CN); Wanliang Feng, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,679

(22) PCT Filed: Dec. 24, 2021

(86) PCT No.: PCT/CN2021/141264

§ 371 (c)(1),
(2) Date: Dec. 29, 2021

(87) PCT Pub. No.: WO2023/097832

PCT Pub. Date: Jun. 8, 2023

(65) Prior Publication Data

US 2024/0046877 A1 Feb. 8, 2024

(30) Foreign Application Priority Data

Dec. 2, 2021 (CN) ......................... 202111460086.2

(51) Int. Cl.
*G09G 3/3258* (2016.01)
*G09G 3/36* (2006.01)

(52) U.S. Cl.
CPC ......... *G09G 3/3258* (2013.01); *G09G 3/3611* (2013.01)

(58) Field of Classification Search
CPC ...... G09G 3/32; G09G 3/3258; G09G 3/3611; G09G 2300/026; G09G 3/3233
See application file for complete search history.

(56) References Cited

U.S. PATENT DOCUMENTS

| | | | | |
|---|---|---|---|---|
| 6,501,441 | B1 | 12/2002 | Ludtke et al. | |
| 2011/0242142 | A1* | 10/2011 | Hussain | G06F 3/1446 345/690 |
| 2014/0240201 | A1* | 8/2014 | Takahashi | G09G 5/10 345/1.3 |

FOREIGN PATENT DOCUMENTS

| | | |
|---|---|---|
| CN | 103236243 | 8/2013 |
| CN | 105554423 | 5/2016 |

(Continued)

*Primary Examiner* — Matthew A Eason
*Assistant Examiner* — Scott D Au

(57) ABSTRACT

The embodiment of the present application discloses a display device, a display system and a distributed function system. The initial pixel driving data corresponding to the image to be displayed, which is received, is segmented into a plurality of pixel driving data blocks by the management chip. With the display screen comprising a plurality of display modules, and the pixel driving data blocks are written to the driving circuits of the corresponding display modules through the data connection lines based on control signals. The driving circuit is employed to drive pixels in the display module to work according to the pixel driving data block, which is received to meet the display requirements of full HD and resolutions above full HD.

19 Claims, 7 Drawing Sheets

(56) References Cited

FOREIGN PATENT DOCUMENTS

| | | | | | |
|---|---|---|---|---|---|
| CN | 105653224 | | | 6/2016 | |
| CN | 109036246 | A | * | 12/2018 | ............... G09G 3/20 |
| CN | 111913633 | A | * | 11/2020 | ............... G06T 3/60 |
| CN | 112035245 | | | 12/2020 | |
| CN | 112233606 | | | 1/2021 | |
| CN | 113395564 | | | 9/2021 | |
| CN | 113553013 | | | 10/2021 | |

* cited by examiner

DISPLAY DEVICE, DISPLAY SYSTEM AND DISTRIBUTED FUNCTION SYSTEM

RELATED APPLICATIONS

This application is a National Phase of PCT Patent Application No. PCT/CN2021/141264 having International filing date of Dec. 24, 2021, which claims the benefit of priority of Chinese Patent Application No. 202111460086.2 filed on Dec. 2, 2021. The contents of the above applications are all incorporated by reference as if fully set forth herein in their entirety.

FIELD AND BACKGROUND OF THE INVENTION

The present application relates to a display technology field, and more particularly to a display device, a display system and a distributed function system.

At present, display devices with large-screen Full High Definition (FHD) and resolutions above Full HD are the development trend in the display field, and high-resolution display devices correspond to a larger amount of data, and the larger amount of data requires a higher data transfer rate. The existing system is integrated in the display device of the display panel (System On Panel, referred to as “SOP”), one option is that the system function is integrated in the non-active area of the display panel, resulting in a serious decline in the proportion of the active area, which does not meet the current full-screen development trend; alternatively, system functions are simply integrated in the gaps between pixels in the active area of the display panel, but cannot carry too high data transmission rates (such as 1000 MHz), leading to that the development of SOP display panels toward the large-screen of full HD and resolutions above full HD is restricted.

Therefore, it is necessary to propose a technical solution to solve the problem that the existing SOP display devices cannot withstand the higher data transmission rate, which limits the development of display devices with Full HD and resolution above Full HD.

SUMMARY OF THE INVENTION

The embodiment of the present application provides a display device, a display system and a distributed function system, to realize the display of full HD and resolution above full HD of the display device.

The embodiment of the present application provides a display device, comprising:

a management chip and a display screen, wherein the management chip is connected to the display screen through data connection lines, and the display screen comprises a plurality of display modules and a plurality of first function modules, and each of the display modules comprises a plurality of display units, and each of the first function modules comprises a plurality of first function units, and the plurality of first function units are arranged between adjacent display units, and each of the display modules is provided with a driving circuit; wherein the management chip is employed to determine initial pixel driving data according to an image to be displayed, which is received, and pack the initial pixel driving data into a plurality of pixel driving data blocks according to parameters of the display modules, and write the pixel driving data blocks to the driving circuits of the corresponding display modules through the data connection lines based on control signals;

the driving circuit of the display module is employed to drive pixels in the display module to work according to the pixel driving data block, which is received, wherein a peak value of a processing capability of the driving circuit is greater than or equal to processing parameters required for processing the pixel driving data block.

In the display device of the present application, a number of pixel driving data blocks is the same as a number of display modules.

In the display device of the present application, the plurality of display modules are arranged in an N*M array, and a number of the data connection lines is m correspondingly, and each data connection line is respectively connected to the N display modules in a corresponding column, where m=M, and M is a positive integer greater than 1, and N is a positive integer greater than 1.

In the display device of the present application, the plurality of display modules are arranged in an N*M array, and a number of the data connection lines is n correspondingly, and each data connection line is respectively connected to the M display modules in a corresponding row, where n=N, and M is a positive integer greater than 1, and N is a positive integer greater than 1.

In the display device of the present application, the plurality of display modules are arranged in an N*M array, and a number of the data connection lines is n*m correspondingly, and each data connection line is respectively connected to the corresponding display modules, where m=M, n=N, and M is a positive integer greater than 1, and N is a positive integer greater than 1.

In the display device of the present application, the management chip is employed to sequentially write each pixel driving data block to the driving circuit of the corresponding display module through the data connection line according to a fixed period.

In the display device of the present application, the management chip is employed to write the corresponding pixel driving data blocks to the driving circuits of the corresponding display modules through the data connection lines when the management chip determines that the respective display modules start to work.

In the display device of the present application, the management chip further comprises a storage module, and the storage module is employed for storing the pixel driving data blocks corresponding to the respective display modules when the display modules display the image to be displayed.

In the display device of the present application, the control signals are transmitted to a first row of display modules in a first direction in the display screen through a control connection line, and the first row of display modules transmits the control signals to other display modules in a second direction.

In the display device of the present application, the control signals are transmitted to the display screen through the control connection lines, and a number of the control connection lines is the same as a number of the display modules, and respective control connection lines are connected to the respective display modules, and the management chip transmits the control signals to the respective display modules through the corresponding control connection lines.

In the display device of the present application, the display screen comprises a first frequency display area and a second frequency display area, and the management chip is employed to control the display modules in the first frequency display area to refresh display at a first frequency, and control the display modules in the second frequency display area to refresh display at a first frequency at a second frequency.

In the display device of the present application, the first frequency display area is arranged around the second frequency display area.

In the display device of the present application, display frequencies of the respective display modules to refresh display are different or the display frequencies of the respective display modules to refresh display are the same.

In the display device of the present application, the management chip is employed to segment the image to be displayed according to arrangement parameters of the display modules to obtain sub-images to be displayed corresponding to the respective display modules, and determine sub-initial pixel driving data corresponding to the respective display modules according to the sub-images to be displayed, and pack the sub-initial pixel driving data into the corresponding pixel driving data blocks.

In the display device of the present application, the management chip is employed to process the image to be displayed according to a resolution of the display screen, resolutions of the display modules, and arrangement parameters of the display modules, so that a resolution of the image to be displayed matches the resolution of the display screen.

In the display device of the present application, the data connection line comprises a data connection line pair or a single data connection line.

In the display device of the present application, the display device comprises a plurality of management chips, and each of the plurality of management chips processes a part of the image to be displayed, and parts of the image to be displayed processed by the respective management chips are combined to form the plurality of pixel driving data blocks corresponding to the image to be displayed.

The embodiment of the present application further provides a display system, comprising a main control chip of generating an image to be displayed and a display device, wherein the display device comprises: a management chip and a display screen, wherein the management chip is connected to the display screen through data connection lines, and the display screen comprises a plurality of display modules and a plurality of first function modules, and each of the display modules comprises a plurality of display units, and each of the first function modules comprises a plurality of first function units, and the plurality of first function units are arranged between adjacent display units, and each of the display modules is provided with a driving circuit; wherein

- the management chip is employed to determine initial pixel driving data of an image to be displayed according to the image to be displayed, which is received, and pack the initial pixel driving data into a plurality of pixel driving data blocks according to parameters of the display modules, and write the pixel driving data blocks to the driving circuits of the corresponding display modules through the data connection lines based on control signals;
- the driving circuit of the display module is employed to drive pixels in the display module to work according to the pixel driving data block, which is received, wherein a peak value of a processing capability of the driving circuit is greater than or equal to processing parameters required for processing the pixel driving data block.

In the display system of the present application, a number of pixel driving data blocks is the same as a number of display modules.

In the display system of the present application, the plurality of display modules are arranged in an N*M array; a number of the data connection lines is m correspondingly, and each data connection line is respectively connected to the N display modules in a corresponding column, where m=M, and M is a positive integer greater than 1, and N is a positive integer greater than 1; or

- a number of the data connection lines is n correspondingly, and each data connection line is respectively connected to the M display modules in a corresponding row, where n=N, and M is a positive integer greater than 1, and N is a positive integer greater than 1; or
- a number of the data connection lines is n*m correspondingly, and each data connection line is respectively connected to the corresponding display modules, where m=M, n=N, and M is a positive integer greater than 1, and N is a positive integer greater than 1.

In the display system of the present application, the management chip is employed to sequentially write each pixel driving data block to the driving circuit of the corresponding display module through the data connection line according to a fixed period.

In the display system of the present application, the management chip is employed to write the corresponding pixel driving data blocks to the driving circuits of the corresponding display modules through the data connection lines when the management chip determines that the respective display modules start to work.

In the display system of the present application, the management chip further comprises a storage module, and the storage module is employed for storing the pixel driving data blocks corresponding to the respective display modules when the display modules display the image to be displayed.

In the display system of the present application, the control signals are transmitted to a first row of display modules in a first direction in the display screen through a control connection line, and the first row of display modules transmits the control signals to other display modules in a second direction.

In the display system of the present application, the control signals are transmitted to the display screen through the control connection lines, and a number of the control connection lines is the same as a number of the display modules, and respective control connection lines are connected to the respective display modules, and the management chip transmits the control signals to the respective display modules through the corresponding control connection lines.

In the display system of the present application, the display screen comprises a first frequency display area and a second frequency display area, and the management chip is employed to control the display modules in the first frequency display area to refresh display at a first frequency, and control the display modules in the second frequency display area to refresh display at a first frequency at a second frequency.

In the display system of the present application, the first frequency display area is arranged around the second frequency display area.

In the display system of the present application, display frequencies of the respective display modules to refresh display are different; or the display frequencies of the respective display modules to refresh display are the same.

In the display system of the present application, the management chip is employed to segment the image to be displayed according to arrangement parameters of the display modules to obtain sub-images to be displayed corresponding to the respective display modules, and determine sub-initial pixel driving data corresponding to the respective display modules according to the sub-images to be displayed, and pack the sub-initial pixel driving data into the corresponding pixel driving data blocks.

In the display system of the present application, the management chip is employed to process the image to be displayed according to a resolution of the display screen, resolutions of the display modules, and arrangement parameters of the display modules, so that a resolution of the image to be displayed matches the resolution of the display screen.

In the display system of the present application, the data connection line comprises a data connection line pair or a single data connection line.

In the display system of the present application, the display device comprises a plurality of management chips, and each of the plurality of management chips processes a part of the image to be displayed, and parts of the image to be displayed processed by the respective management chips are combined to form the plurality of pixel driving data blocks corresponding to the image to be displayed.

The embodiment of the present application further provides a distributed function system, comprising:

- a management chip and a function device, wherein the management chip is connected to the function device through data connection lines, and the function device comprises a plurality of function modules, and each of the function modules is provided with a driving circuit; wherein
- the management chip is employed to determine initial driving data according to initial driving data corresponding to a function to be implemented, and pack the initial driving data into a plurality of driving data blocks according to parameters of the function modules, and write the driving data blocks to the driving circuits of the corresponding function modules;
- the driving circuit of the function module is employed to drive function unit in the function module to work according to the driving data block, which is received, wherein a peak value of a processing capability of the driving circuit is greater than or equal to processing parameters required for processing the driving data block.

The embodiment of the present application provides a display device, a display system and a distributed function system. The display device comprises a management chip and a display screen. The initial pixel driving data corresponding to the image to be displayed, which is received, is segmented into a plurality of pixel driving data blocks by the management chip. With the display screen comprising a plurality of display modules, and the pixel driving data blocks are written to the driving circuits of the corresponding display modules through the data connection lines based on control signals. A peak value of a processing capability of the driving circuit is greater than or equal to processing parameters required for processing the pixel driving data block. The driving circuit of the display module is employed to drive pixels in the display module to work according to the pixel driving data block, which is received. Thus, the data transmission bandwidth/data transmission rate of each display module is greatly reduced, so that the display device can process high-frequency standard signals, to realize the display of the image to be displayed on the display screen to meet the display requirements of full HD and resolutions above full HD.

BRIEF DESCRIPTION OF THE SEVERAL VIEWS OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DESCRIPTION OF SPECIFIC EMBODIMENTS OF THE INVENTON

Figure 1:
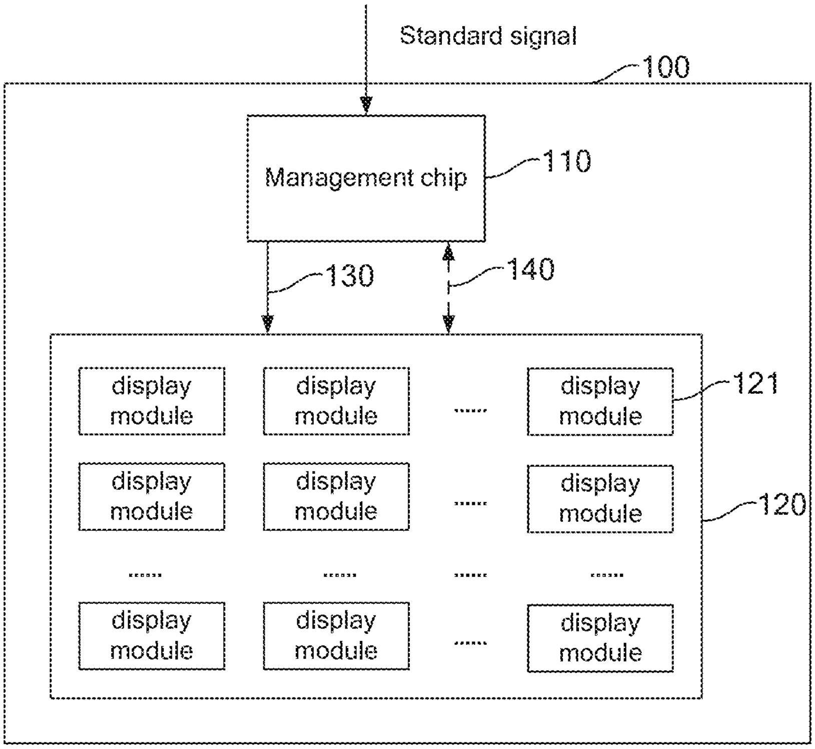
FIG. 1 is a structural diagram of a display device provided by an embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application.

The display device of the existing system integrated on the display panel is difficult to develop toward the large-screen high-resolution display. The main reason is that the display panel and function devices composing a traditional display device comprise thin film transistors, driving circuits, capacitors or resistors, etc. Thin film transistors, driving circuits, capacitors, resistors and other components only have the ability to process low-speed signals. When these components input signals with a rate/bandwidth beyond their processing capabilities, problems such as failure will occur, which will cause the display panel or function devices to fail to normally work. Particularly, thin film transistors prepared by physical deposition, chemical deposition, and etching techniques on the display panel are limited by the manufacturing process. As a result, the peak processing capacity of the device on the traditional display panel has process limitations, and the purpose of processing high-frequency signals cannot be achieved by simply improving the processing capacity of the aforesaid components.

Based on the foregoing limitations, the display device disclosed in the embodiment of the present application comprises a management chip and a display screen. The initial pixel driving data corresponding to the image to be displayed in the high-frequency standard signal is packed into a plurality of pixel driving data blocks by the management chip. With the display screen composed of a plurality of display modules that can receive and process respective pixel driving data blocks, a peak value of a processing capability of the driving circuit of the display module is greater than or equal to processing parameters required for processing the corresponding driving data block. Thus, the initial pixel driving data corresponding to the image to be displayed in the high-frequency standard signal is packed into the plurality of pixel driving data blocks, and the plurality of display modules of the display screen receives the respective pixel driving data blocks to drive the pixels in the display modules to work. The data transmission bandwidth/data transmission rate of each display module is greatly reduced, so that the display device can process high-frequency standard signals, to realize the display of the image to be displayed on the display screen to meet the display requirements of full HD and resolutions above full HD.

The display device, the display system and the distributed function system of the present application will be described in detail below in conjunction with specific embodiments.

Please refer to FIG. 1, which is a structural diagram of a display device provided by an embodiment of the present application. The display device 100 comprises a management chip 110 and a display screen 120. The management chip 110 is connected to the display screen 120 through data connection lines 130 and control connection lines 140. The data connection line 130 is employed to transmit data signals, and the control connection line 140 is employed to transmit control signals. In order to distinguish, the data connection line 130 is represented by a solid line, and the control connection line 140 is represented by a broken line.

The display screen 120 comprises a plurality of display modules and a plurality of first function modules (not shown in the figure). It is understandable that the present application splits the display part in the traditional technology into a plurality of display modules, and each display module 121 comprises a driving circuit (not shown in the figure), and multiple display modules are arranged in a distributed manner.

Each display module comprises a plurality of display units (not shown in the figure), and the plurality of display units are arranged in a matrix. Each display unit comprises at least one light-emitting element, and the light-emitting element may be a liquid crystal cell, a micro-LED (Micro-LED), a sub-millimeter light-emitting diode (Mini-LED), an organic light-emitting diode, etc., and there is no limitation here. The driving circuit comprises a plurality of pixel driving circuits, and each display unit comprises a pixel driving circuit that drives the light-emitting element to emit light.

The first function module comprises one or more of a source driving module, a gate driving module, a timing control module, a ROM module, a RAM module, a CPU module, an artificial (AI) smart module, an antenna module, an audio module, a sensor module and a power supply module. Each of the plurality of first function modules may be different. Each first function module is employed to receive a corresponding first function signal, and each first function module comprises a plurality of first function units. The parameter of each first function signal is less than or equal to the peak processing capacity of the corresponding first function module.

Each first function unit is arranged between a plurality of adjacent display units. The first function unit can be a single component such as a transistor, an inductor, a resistor, a capacitor, etc., and the first function unit can also be composed of multiple components. The first function unit can be prepared by the manufacturing process of a traditional display panel, and the first function unit can also be fixed on the display device by welding, bonding or interface connection.

A portion of the components composing the first function unit can be prepared by the manufacturing process of a traditional display panel, and the other portion of components composing the first function unit can also be fixed on the display device by welding, bonding or interface connection. A portion of the components composing the first function unit can be prepared by the manufacturing process of a traditional display panel, and the other portion of components composing the first function unit can also be fixed on the display device by welding, bonding or interface connection. The processing capabilities of the components composing the first function unit are limited, so that the processing capability of the first function unit is limited, and thus, the processing capability of the first function module composed of the plurality of first function units is limited. Therefore, the parameter of each first function signal is less than or equal to the peak processing capacity of the corresponding first function module, so that the plurality of first function modules are distributedly arranged on the display device, which further provides a basis for processing high-frequency signals for the distributed SOP display device.

A peak value of a processing capability of the driving circuit of each display module is greater than or equal to processing parameters required for processing the corresponding driving data block, so that each display module can handle pixel driving blocks within its processing capacity to constitutes a whole distributed SOP display device, which can effectively process high-resolution images to be displayed.

The management chip 110 is employed to determine initial pixel driving data according to an image to be displayed in the received standard signal, and pack the initial pixel driving data into a plurality of pixel driving data blocks according to parameters of the display modules, and write the pixel driving data blocks to the driving circuits of the corresponding display modules 121 through the data connection lines 130 based on control signals.

Figure 2:
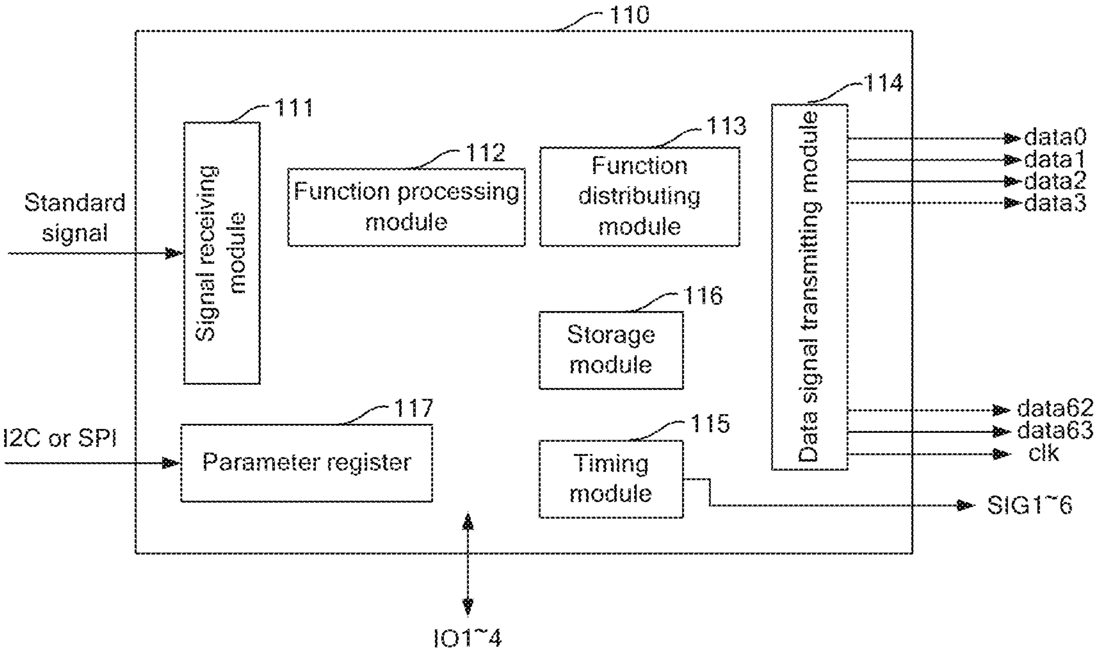
FIG. 2 is a structural diagram of a management chip provided by an embodiment of the present application.

FIG. 2 is a structural diagram of a management chip 110 provided by an embodiment of the present application. The management chip 110 comprises a signal receiving module 111, a function processing module (image processing module) 112 connected to the signal receiving module 111, a function distributing module (image distributing module) 113 connected to the function processing module 112, and a data signal transmitting module 114 connected to the function distributing module 113 and a timing module 115. The management chip 110 may further comprises modules such as a storage module 116 and a parameter register 117.

The signal receiving module 111 is employed to receive a standard signal. The standard signal comprises various display standard signals, such as Low-Voltage Differential Signaling signals (LVDS signals), Mobile Industry Processor Interface signals (MIPI signals), Embedded DisplayPort signals (eDP interface signals) and V-By-One signal, etc. The standard signal in the embodiment of the present application is described by taking a high-frequency standard signal that realizes full HD and resolutions above full HD as an illustration. The standard signal is generated by the device terminal or the signal source terminal, and the generated standard signal is transmitted to the management chip 110, and the management chip 110 performs corresponding processing. The device terminal or signal source terminal comprises mobile terminals, embedded devices, PCs, tablets and other devices. The standard signal comprises the RGB data signal, the RGB data signal corresponds to the picture to be displayed, and the picture to be displayed comprises the image to be displayed, the text to be displayed, and so on. The following description will be given by taking the image to be displayed in the picture to be displayed as an example.

The function processing module 112 is employed to perform function processing on the image to be displayed, such as image processing, for instance, color enhancement, local dimming, high dynamic light rendering, and so on. In some embodiments, the function processing module 112 is not necessary.

In one embodiment, the function processing module 112 is further configured to: when the frequency of the received standard signal is greater than the display frequency of the display screen 120, according to the frequency of the standard signal and the display frequency of the display screen 120, the image to be displayed, which is received, is extracted to match the display frequency of the display screen 120.

For instance, if the frequency of the standard signal is 120 Hz, and the display frequency of the display screen is 30 Hz, the function processing module 112 is also employed to extract one target image to be displayed from every four images to be displayed, and the target image to be displayed is transmitted to the function distributing module 113 for processing.

The function distributing module 113 determines the initial pixel driving data according to the image to be displayed. The initial pixel driving data comprises each pixel value of the image to be displayed and driving data corresponding to each pixel value, such as a driving voltage. After the initial pixel driving data is determined, the initial pixel driving data is packed into a plurality of pixel driving data blocks according to parameters of the display modules. The parameters of the display modules comprise the arrangement parameters of the display modules, the number of the display modules, the resolutions of the display modules, and so on.

In one embodiment, the number of pixel driving data blocks is the same as the number of display modules. According to the arrangement parameters of the display modules, the number of display modules, etc., the initial pixel driving data is packed into a plurality of pixel driving data blocks consistent with the arrangement parameters and the same number. Simply understood, the initial pixel driving data is packed into the plurality of pixel driving data blocks corresponding to the plurality of display modules one-to-one. Thus, the initial pixel driving data corresponding to the image to be displayed is segmented into a plurality of pixel driving data blocks, wherein the data volume of each pixel driving data block is smaller than the data volume of the image to be displayed. In other embodiment, the number of pixel driving data blocks can be different from the number of display modules.

The data signal transmitting module 114 is configured to write each pixel driving data block to the driving circuit of the corresponding display module through the data connection line 130 based on the control signal. Specifically, respective pixel driving data blocks are written from the different data connection lines 130 to the driving circuits of the corresponding display modules. Specifically, the data signal transmitting module 114 also simultaneously transmits the clock signal clk to the corresponding display module through the corresponding data connection line.

As shown in FIG. 2, there are 64 data connection lines 130 correspondingly in total, which can be represented by data0, data1, data2, . . . , Data63, etc., respectively. The first pixel driving data block can be written to the first display module in the display screen 120 through data0, and the second pixel driving data block can be written to the second display module through data1, and the third pixel driving data block can be written to the third display module through data2. Understandably, each segmented pixel driving data block is written into each display module 121 in the display screen through the corresponding data connection line.

The data connection line 130 can be a data connection line pair or a single data connection line. As shown in FIG. 2, the data connection lines 130 may be 64 data connection line pairs or 64 single data connection lines. When the data connection lines 130 are data connection line pairs, the data transmission efficiency can be improved. When the data connection lines 130 are single data connection lines, the management chip 110 further needs to process the received standard signal to realize data transmission through the single data connection line. In the following, the data connection line can be either a data connection line pair or a single data connection line.

The timing module 115 is employed to generate control signals for each display module 121. The plurality of display modules 121 can share the control signals. The control signal comprises a driving signal, a select signal (not shown in the figure), and so on. The select signal is employed to select the display module that currently needs to transmit the control signal. As shown in FIG. 2, the control signals comprise SIG1, SIG2, . . . SIG6, which can be represented by SIG1~6.

The storage module 116 is employed to store the image to be displayed or the pixel driving data block corresponding to the image to be displayed, etc. For instance, when there is no standard signal input to the management chip 110, the image to be displayed stored in the storage module 116 can be employed to refresh the screen of the display screen 120.

The storage module 116 may be configured to loss store data after power failure. In some embodiments, the storage module 116 is not necessary.

The parameter register 117 is respectively connected to the function processing module 112 and the function distributing module 113, and is employed to configure basic image information, image processing parameters and image segmentation parameters, etc. If the extended display identification data (EDID) of the display required, such as the supplier information of the display, the maximum image size, color settings, manufacturer presets, frequency range limitations and the string of the display screen name and serial number, etc., can also be configured in the parameters. The information in the parameter register can be written externally through the I2C protocol or the SPI (Serial Peripheral Interface) protocol, and it will not disappear after power failure.

The driving circuit of the display module 121 is employed to drive pixels in the display module 121 to work according to the pixel driving data block, which is received. Since each display module receives the corresponding pixel driving data block after division, the data amount of the corresponding pixel driving data block after division is less than the data amount of the image to be displayed, which greatly reduces the signal transmission bandwidth inside each display module. The peak value of the processing capability of the driving circuit of the display module 121 is greater than or equal to the processing parameters required for processing the pixel driving data block, so that the driving circuit can process the pixel driving data block, which is received.

For instance, if the resolution of the display screen 120 is 3840RGB*2160, the total bandwidth is about 14 Gbps. If the resolution of the display module 121 is 60RGB*120, the display modules are arranged in an 18*64 array (the plurality of display modules in the display screen are arranged in 18 rows and 64 columns). The initial pixel driving data corresponding to the image to be displayed is distributed according to 18*64 (18 rows and 64 columns), and 64 data connection lines 130 are employed for the transmission of pixel driving data blocks. Then, the bandwidth of each data connection line 130 is 14 Gbps/64, about 220 Mbps, and the bandwidth assigned to each display module 121 is 220 Mbps/18, about 12.5 Mbps, which greatly reduces the internal signal transmission bandwidth of each display module 121.

In the embodiment, the initial pixel driving data corresponding to the image to be displayed in the high-frequency standard signal is packed into a plurality of pixel driving data blocks by the management chip 110. With the display screen 120 composed of a plurality of display modules 121 that can receive and process respective pixel driving data blocks, the peak value of a processing capability of the driving circuit of the display module 121 is greater than or equal to processing parameters required for processing the respective driving data block. The plurality of display modules 121 of the display screen 120 receives the respective pixel driving data blocks to drive the pixels in the display modules to work, so that the display device 100 can process high-frequency standard signals, to realize the display of the image to be displayed on the display screen 120 to meet the display requirements of full HD and resolutions above full HD.

In one embodiment, the function distributing module 113 in the management chip 110 is employed to segment the image to be displayed according to the arrangement parameters of the display modules to obtain sub-images to be displayed corresponding to the respective display modules, and determine sub-initial pixel driving data corresponding to the respective display modules according to the sub-images to be displayed, and pack the sub-initial pixel driving data into the corresponding pixel driving data blocks.

For instance, the arrangement parameters of the display module is an N*M array arrangement, and the image to be displayed is segmented according to the arrangement parameters into N*M sub-images to be displayed. It can be simply understood as segmenting the image to be displayed into N*M sub-images. The sub-initial pixel driving data corresponding to the respective display modules is determined according to the sub-images to be displayed, and the sub-initial pixel driving data corresponding to the respective display modules is packed into the respective pixel driving data blocks to obtain N*M pixel driving data blocks.

In one embodiment, the plurality of display modules are arranged in an N*M array, and a number of the data connection lines 130 is m correspondingly, and each data connection line is respectively connected to the N display modules in a corresponding column. N is the number of rows to arrange the display module, M is the number of columns to arrange the display module, m=M, and M is a positive integer greater than 1, and N is a positive integer greater than 1.

Figure 3:
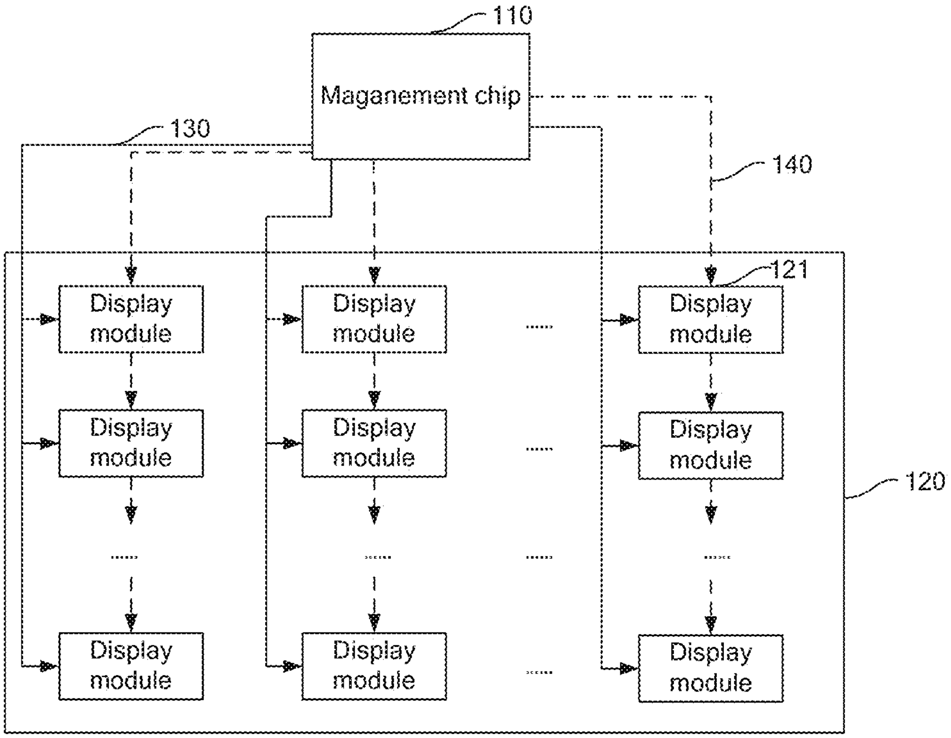
FIG. 3 is a first diagram of the connection relationship between the data connection lines, the control connection lines and the display modules provided by the embodiment of the present application.
Figure 4:
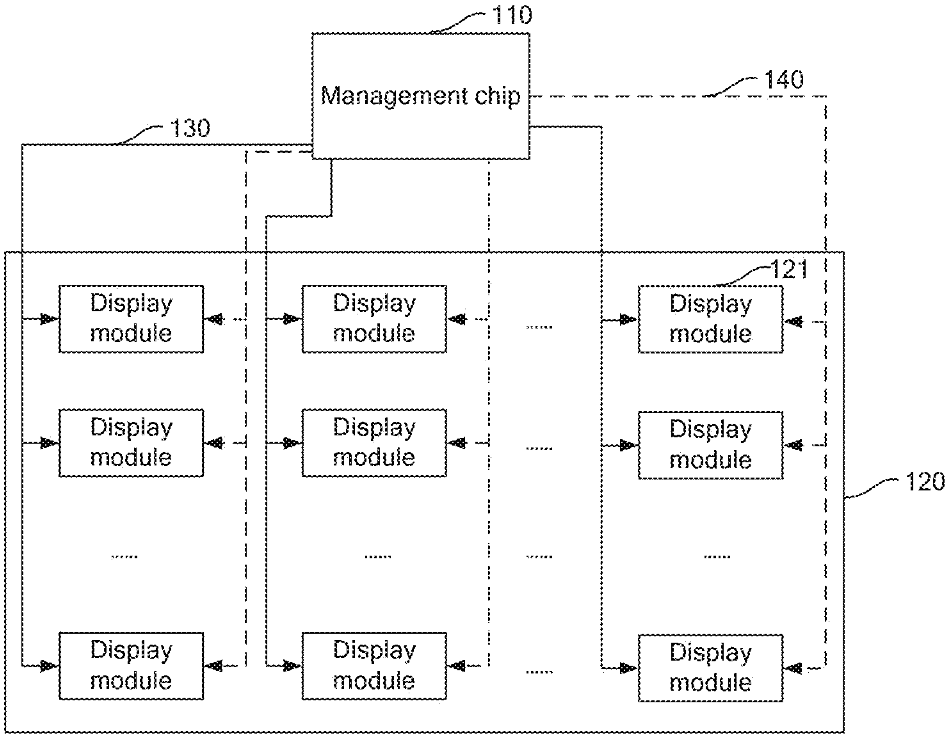
FIG. 4 is a second diagram of the connection relationship between the data connection lines, the control connection lines and the display modules provided by the embodiment of the present application.
Figure 5:
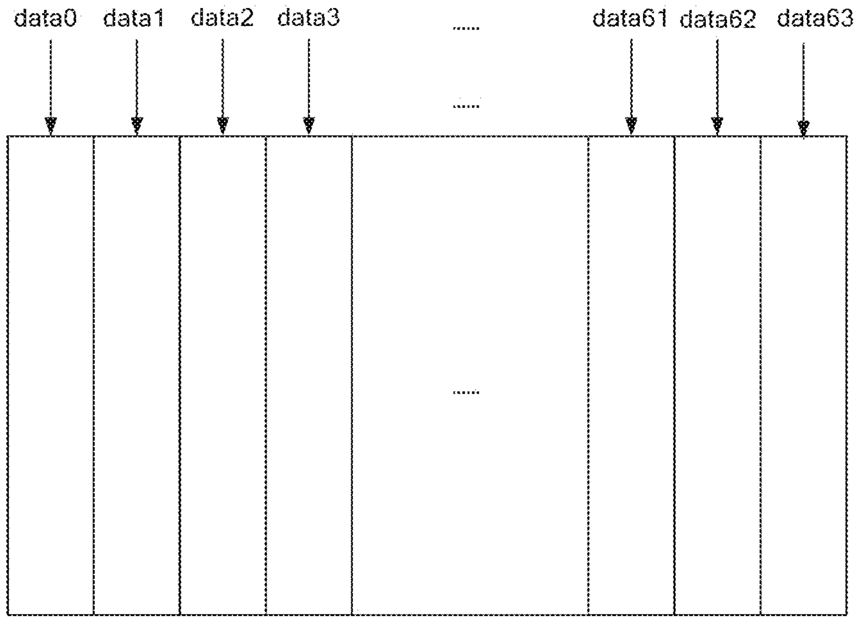
FIG. 5 is a diagram of data connection lines provided by an embodiment of the present application and a method of segmenting pixel driving data blocks transmitted by the data connection lines.

FIG. 3 and FIG. 4 respectively show a first diagram and a second diagram of the connection relationship between the data connection lines, the control connection lines and the display modules provided by the embodiment of the present application. FIG. 5 is a diagram of data connection lines provided by an embodiment of the present application and a method of segmenting pixel driving data blocks transmitted by the data connection lines. It should be noted that the pixel driving data block transmitted by each data connection line is also segmented, but it is not shown in FIG. 5.

The plurality of display modules arranged in an 18*64 array is illustrated for description. Please refer to FIG. 3 and FIG. 4. The plurality of display modules in the display screen are arranged in 18 rows and 64 columns. m=M=64, N=18. There are 64 data connection lines, which correspond to the 64 columns of display modules 121 one-to-one, as shown in FIG. 5. The management chip 110 is connected to 64 columns of display modules in the display screen 120 through 64 data connection lines, and each data connection line is connected to 18 display modules in the corresponding column.

For instance, data0 is connected to the 18 display modules in the first column, data1 is connected to the 18 display modules in the second column, . . . , data63 is connected to the 18 display modules in the last column.

In one embodiment, the plurality of display modules are arranged in an N*M array, and a number of the data connection lines is n correspondingly, and each data connection line is respectively connected to the M display modules in a corresponding row, where n=N, and M is a positive integer greater than 1, and N is a positive integer greater than 1.

Figure 6:
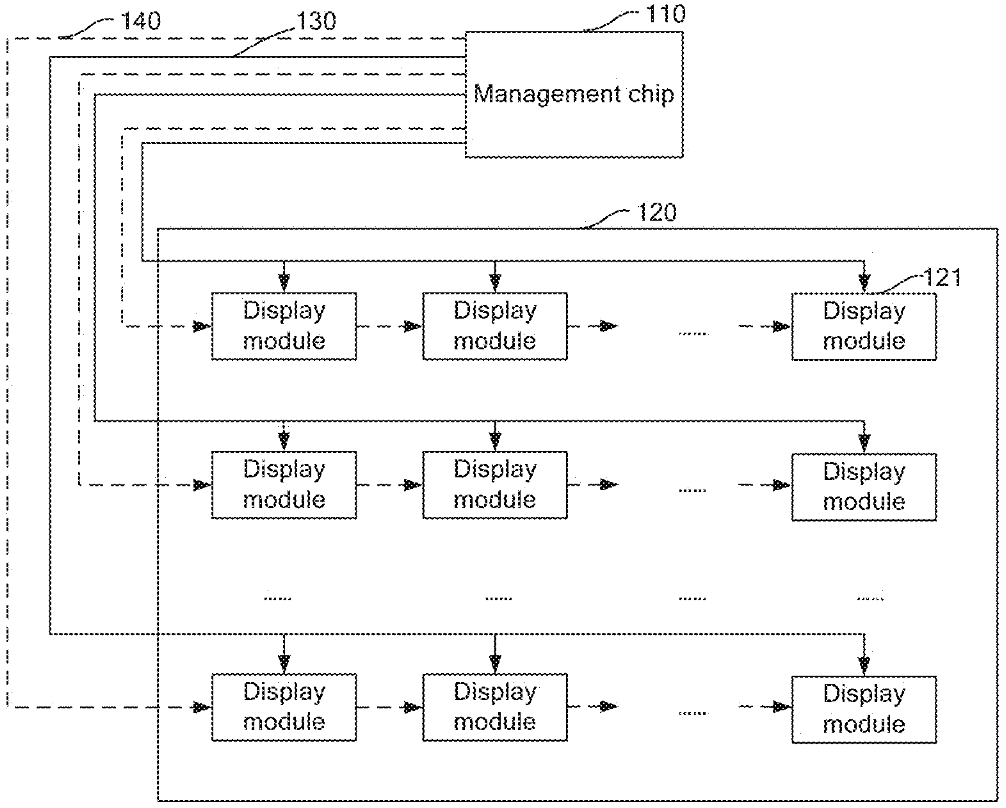
FIG. 6 is a third diagram of the connection relationship between the data connection lines, the control connection lines and the display modules provided by the embodiment of the present application.
Figure 7:
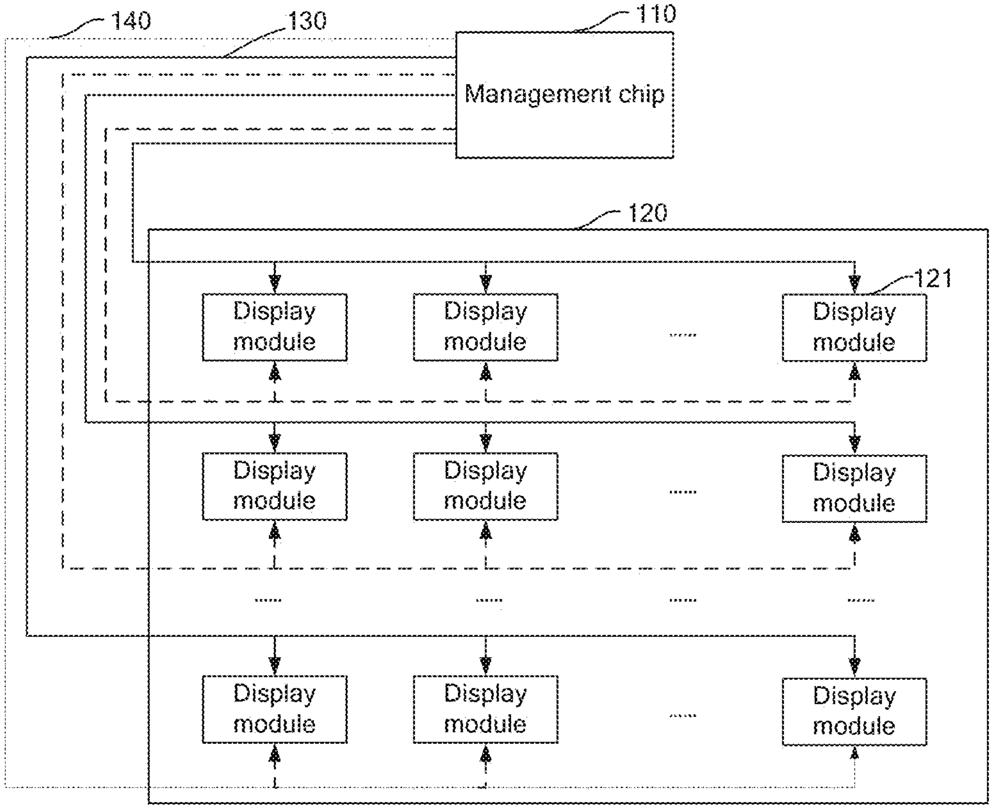
FIG. 7 is a fourth diagram of the connection relationship between the data connection lines, the control connection lines and the display modules provided by the embodiment of the present application.
Figure 8:
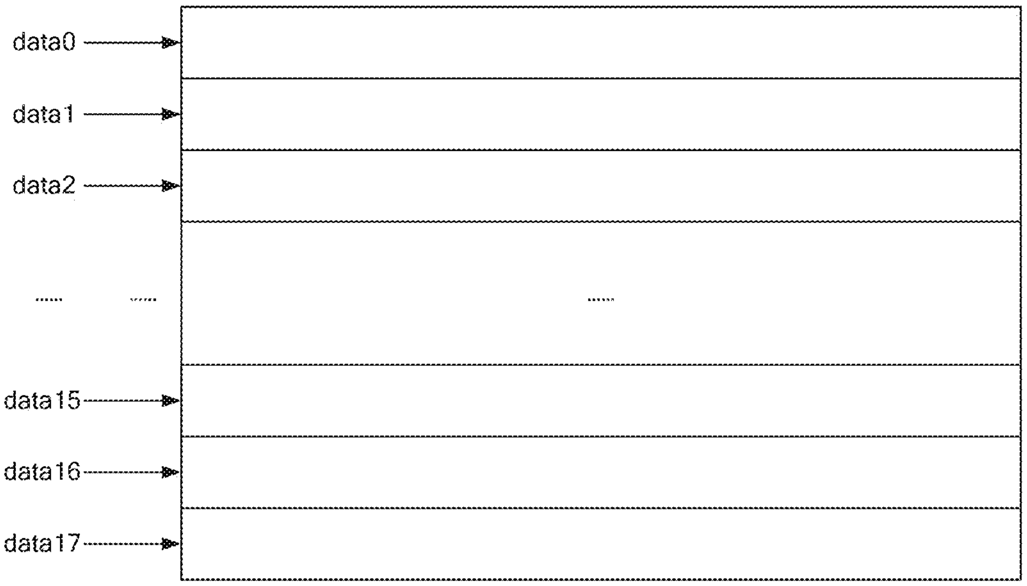
FIG. 8 is a diagram of data connection lines provided by an embodiment of the present application and a method of segmenting pixel driving data blocks transmitted by the data connection lines.

FIG. 6 and FIG. 7 respectively show a fifth diagram and a sixth diagram of the connection relationship between the data connection lines, the control connection lines and the display modules provided by the embodiment of the present application. FIG. 8 is a diagram of data connection lines provided by an embodiment of the present application and a method of segmenting pixel driving data blocks transmitted by the data connection lines. It should be noted that the pixel driving data block transmitted by each data connection line is also segmented, but it is not shown in FIG. 8.

The plurality of display modules arranged in an 18*64 array is illustrated for description. Please refer to FIG. 6, FIG. 7 and FIG. 8. The plurality of display modules in the display screen are arranged in 18 rows and 64 columns. n=N=18, M=64. There are 18 data connection lines, which correspond one-to-one with the 18 rows of display modules. The management chip 110 is respectively connected to the 18 rows of display modules in the display screen 120 through 18 data connection lines, and each data connection line is respectively connected to 64 display modules in the corresponding row.

For instance, data0 is connected to the 64 display modules in the first row, data1 is connected to the 64 display modules in the second row, . . . , data63 is connected to the 64 display modules in the last column.

In one embodiment, the plurality of display modules are arranged in an n*m array, and a number of the data connection lines is n correspondingly, and each data connection line is respectively connected to the corresponding display module, where n=N, m=M, and M is a positive integer greater than 1, and N is a positive integer greater than 1.

Figure 9:
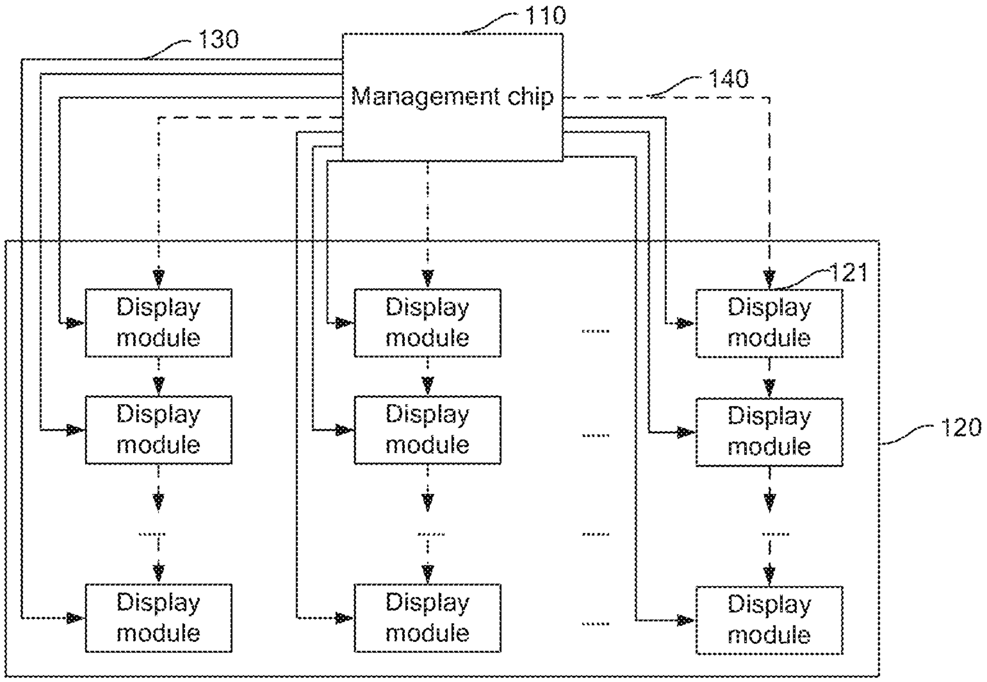
FIG. 9 is a fifth diagram of the connection relationship between the data connection lines, the control connection lines and the display modules provided by the embodiment of the present application.
Figure 10:
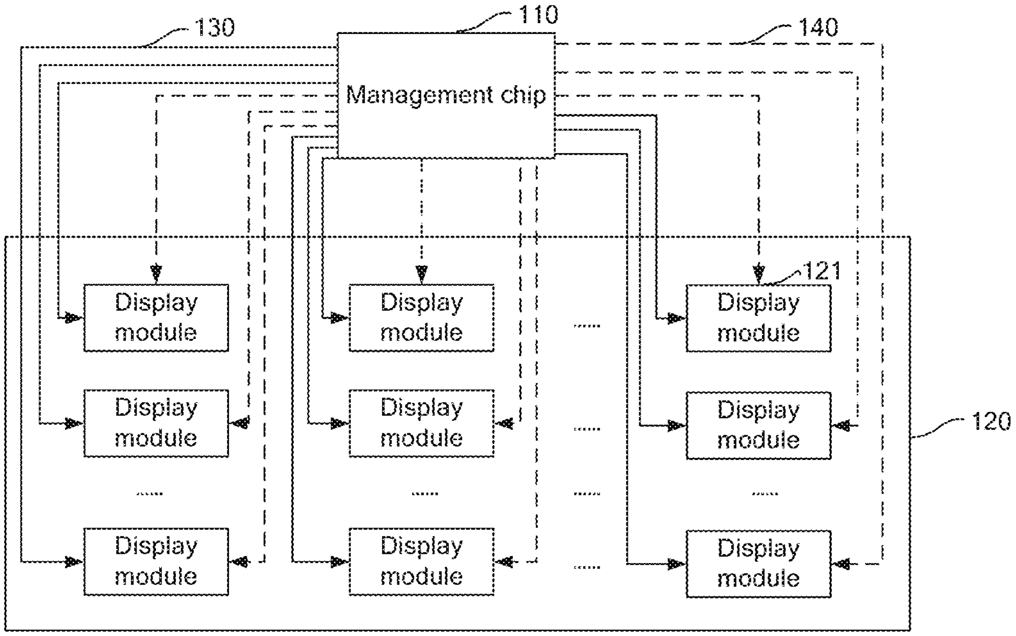
FIG. 10 is a sixth diagram of the connection relationship between the data connection lines, the control connection lines and the display modules provided by the embodiment of the present application.

FIG. 9 and FIG. 10 respectively show a fifth diagram and a sixth diagram of the connection relationship between the data connection lines, the control connection lines and the display modules provided by the embodiment of the present application. The plurality of display modules arranged in an 18*64 array is illustrated for description. Please refer to FIG. 9 and FIG. 10. The plurality of display modules in the display screen are arranged in 18 rows and 64 columns. n=N=18, m=M=64. There are 18*64 data connection lines, which correspond one-to-one with the 18*64 rows of display modules. The management chip 110 is connected to the 18*64 display modules in the display screen 120 through 18*64 data connection lines, and each data connection line is connected to one display module.

For instance, data0 is connected to the display module in the first row and first column, data1 is connected to the display module in the first row and second column, . . . , data63 is connected to the display module in the first row and last column, and data64 is connected to the display module in the second row and first column, and so on.

In one embodiment, the data signal transmitting module 114 of the management chip 110 sequentially write each pixel driving data block to the driving circuit of the corresponding display module through the data connection line 130 according to a fixed period. The fixed period can be determined by the refresh frequency of the display screen and the arrangement parameters of the display modules.

For instance, the refresh frequency of the display screen 120 is 60 Hz, and the arrangement parameters of the display modules is the N*M array arrangement. When there are m data connection lines 130 (m=M), and each data connection line is connected to N display modules in the corresponding column, the method for determining the fixed period may be: 1/60/N, and the management chip 110 transmits the pixel driving data block corresponding to each row according to the fixed period. When there are n data connection lines 130 (n=N), and each data connection line is connected to M display modules in the corresponding row, the method for determining the fixed period may be: 1/60/M, and the management chip 110 transmits the pixel driving data block corresponding to each column according to the fixed period. When there are n*m data connection lines 130 (m=M, n=N), and each data connection line is connected to the corresponding display module, the pixel driving data blocks in each row/column can be transmitted according to the fixed period, or N*M pixel driving data blocks can be respectively transmitted to the corresponding display modules through n*m data connection lines at the same time.

In one embodiment, the data signal transmitting module 114 of the management chip 110 is employed to write the corresponding pixel driving data blocks to the driving circuits of the corresponding display modules through the data connection lines 130 as determining that the respective display modules start to work.

After the display of each display module of the display screen 120 is completed, a processing completion signal is transmitted to the management chip 110. According to the processing completion signal, the management chip 110 writes the pixel driving data block corresponding to the next display module into the driving circuit of the corresponding display module through the data connection line 130.

No matter if there are m data connection lines 130 (m=M), and each data connection line is connected to the N display modules in the corresponding column, or there are n data connection lines 130 (n=N), and each data connection line is connected to M display modules in the corresponding row, or there are n*m (m=M, n=N) corresponding to the data connection line 130, and each data connection line is connected to the corresponding display modules, This method can be employed to write the corresponding pixel driving data block to the driving circuit of the corresponding display module through the data connection line 130.

It should be noted that whether the management chip 110 writes each pixel driving data block to the driving circuit of the corresponding display module through the data connection line in the fixed period, or when it is determined that each display module starts to work, the corresponding pixel driving data block is written to the pixel circuit of the corresponding display module through the data connection line, it is required to cooperate with the storage module 116 to realize the corresponding function together. Correspondingly, the storage module 116 is employed to store the pixel driving data block corresponding to each display module when displaying the image to be displayed, or to store the sub-image to be displayed corresponding to each display module. This is because the pixel driving data blocks are not transmitted continuously, and the storage module is needed to save the corresponding pixel driving data blocks or the corresponding sub-images to be displayed.

The management chip 110 is also employed to generate control signals. Specifically, the control signals are generated by the timing module 115 of the management chip 110. The control signals are transmitted to the display screen 120 through the control connection lines 140.

In one embodiment, the control signals are transmitted to the first row of display modules in the first direction in the display screen 120 through the control connection line 140, and the first row of display modules transmits the control signals to other display modules in the second direction.

First, the control signals are transmitted to the first row of display modules in the first direction in the display screen 120. At this time, the select signals of the first row of display modules in the first direction are in a valid state, indicating that the first row of display modules in the first direction is currently selected. The first row of display modules in the first direction cooperate with the corresponding pixel driving data blocks to drive the pixels in the first row of display modules to realize the display of the first row of display modules in the first direction. After the display of the first row of display modules in the first direction is completed, the first row of display modules transmit the control signals to the second row of display modules in the second direction, and meanwhile, the select signals of the second row of display modules is in a valid state, indicating that the second row of display modules in the first direction is currently selected. The second row of display modules in the first direction cooperates with the corresponding pixel driving data blocks to drive the pixels in the second row of display modules to realize the display of second row of display modules in the first direction. By analogy, the entire display screen is displayed.

It can be simply understood that the control signal of the i-th display module in the first direction is transferred by the driving circuit of the i−1th display module in the first direction.

For instance, when there are m data connection lines 130 (m=M), and each data connection line is connected to N display modules in the corresponding column, as shown in FIG. 3, the first direction corresponding to the control signal refers to the direction in which the rows are located, and the second direction refers to the direction in which the columns are located. When there are n data connection lines 130 (n=N), and each data connection line is connected to M display modules in the corresponding row, as shown in FIG. 6, the first direction corresponding to the control signal refers to the direction of the column, and the second direction refers to the direction of the row. When there are n*m data connection lines 130 (m=M, n=N), and each data connection line is connected to the corresponding display module, it can be that the first direction is the direction where the rows are and the second direction is the direction where the columns are; or the first direction is the direction where the columns are, and the second direction is the direction where the rows are. As shown in FIG. 9, correspondingly, the first direction is the direction where the rows are, and the second direction is the direction where the columns are.

In one embodiment, a number of control connection lines 140 is the same as a number of display modules 121. Each control connection line is connected to one display module, and the management chip 110 transmits a control signal to each display module through the corresponding control connection line.

Understandably, in this case, the control signal of each display module is generated by the management chip 110, and the management chip 110 controls the control signal of each display module, which facilitates the control of each display module. The control signal is transmitted to each display module through the control connection line 140, and the control signal of each display module cooperates with the pixel driving data block of the corresponding display module to drive the pixels in the corresponding display module to display.

As shown in FIG. 4, FIG. 7, and FIG. 10, the number of control connection lines 140 is the same as the number of display modules. Each control connection line is respectively connected with one display module to transmit the control signals to the respective display modules.

In one embodiment, the display screen 120 comprises a first frequency display area and a second frequency display area. The management chip 110 is employed to control the display modules in the first frequency display area to refresh display at a first frequency, and control the display modules in the second frequency display area to refresh display at a first frequency at a second frequency. In this case, the control signals are generated by the management chip 110.

The amount of the display module in the first frequency display area can be one or more, and the amount of the display module in the second frequency display area can be one or more. When the first frequency display area comprises one display module and the second frequency display area also comprises one display module, the display screen 120 may further comprises one or more other frequency display areas. In the embodiment of the present application, the first frequency display area and the second frequency display area both comprises a plurality of display modules as an illustration for description.

The first frequency for refreshing display of each display module in the first frequency display area may be the same or different from the second frequency for refreshing display of each display module in the second frequency display area. The control signal comprises a synchronization signal. If the frequencies are the same, it means that the synchronization signals corresponding to the respective display modules are the same; If the frequencies are not the same, it means that the control signal of each display module in the first frequency display area is different from the synchronization signal of each display module in the second frequency display area.

In one embodiment, the first frequency display area is arranged around the second frequency display area. If the second frequency display area is arranged at the central part of the display screen, the first frequency display area is arranged around the second frequency display area. The first frequency can be set to be lower than the second frequency. Since the human eyes are more likely to focus on the position of the central part of the display screen as watching the display screen, or the human eyes pay more attention to the position of the central part of the display screen, the second frequency of refreshing display of each display module in the second frequency display area is set higher than the first frequency of refreshing display of each display module in the first frequency display area to improve the viewing effect.

Figure 11:
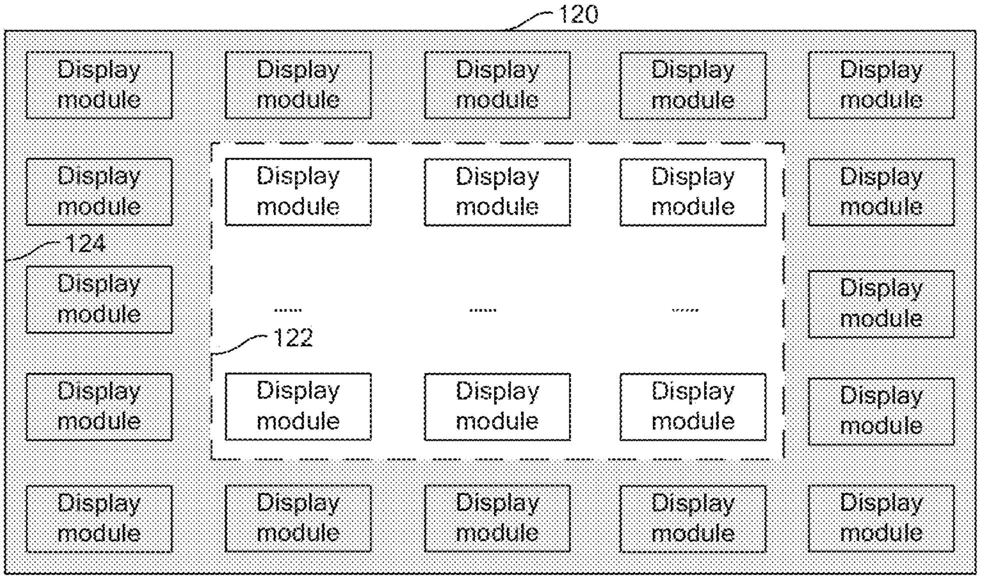
FIG. 11 is a diagram of a first frequency display area and a second frequency display area provided by an embodiment of the present application.

As shown in FIG. 11, the display screen 120 comprises a first frequency display area 122 and a second frequency display area 124. Both the first frequency display area 122 and the second frequency display area 124 comprise a plurality of display modules. In FIG. 11, the first frequency display area is indicated in gray, and the second frequency display area is indicated in white. The first frequency display area 122 is arranged to around the second frequency display area 124.

In one embodiment, the display frequencies of the respective display modules to refresh display are different. In this case, the control signals are generated by the management chip 110. The control signal comprises a synchronization signal. The synchronization signals of the display modules generated by the management chip 110 are different, so that the refresh display of the respective display modules at different frequencies is realized.

In one embodiment, in the condition that the control signals are transmitted to the first row of display modules in the first direction in the display screen 120 through the control connection line 140, and the first row of display modules transmits the control signals to other display modules in the second direction, when the first direction is the direction of the row and the second direction is the direction of the column, the refresh frequency of each display module in each column can be controlled to be the same, and the refresh frequencies of the respective display modules of the respective columns are different; when the first direction is the direction of the column and the second direction is the direction of the row, the refresh frequency of each display module in each row can be controlled to be the same, and the refresh frequencies of the respective display modules of the respective rows are different.

In one embodiment, the display frequencies of the respective display modules to refresh display are the same. The control signal comprises a synchronization signal. In this case, the synchronization signal of each display module is the same, and the refresh display of all display modules with the same frequency is realized. In the case where the control signal is transferred, or in the case where the management chip generates the control signal of each display module, it can be achieved that the display frequency of the refresh display of each display module is the same.

In one embodiment, the management chip 110 is employed to process the image to be displayed according to the resolution of the display screen, the resolutions of the display modules, and the arrangement parameters of the display modules, so that the resolution of the image to be displayed matches the resolution of the display screen. Specifically, it can be implemented by the function processing module 112 of the management chip. In this embodiment, the image to be displayed is matched with the display screen, for instance, the resolution of the image to be displayed is the same as the resolution of the display screen, so as to avoid display abnormalities.

Specifically, the function processing module 112 obtains the resolution of the display screen and the arrangement parameters of the display modules. For instance, the arrangement parameter of the display modules is the N*M array arrangement to processes the image to be displayed. When the resolution of the image to be displayed is higher than the resolution of the display screen, processing the image to be displayed comprises: down-sampling the image to be displayed so that the resolution of the image to be displayed, which is processed, is the same as the resolution of the display screen. When the resolution of the image to be displayed is lower than the resolution of the display screen, processing of the image to be displayed comprises: adding redundant pixel rows and/or adding redundant pixel columns to the image to be displayed, or processing in other ways.

In the embodiment of the present application, the case where the resolution of the image to be displayed is lower than the resolution of the display screen is taken as an illustration for description. For instance, the resolution of the display screen is 3840RGB*2160, the resolution of the display module is 60RGB*120, and the resolution of the image to be displayed is 3830*2150. N*M is 18*64. The plurality of display modules in the display screen are arranged in 18 rows and 64 columns. If what is needed is to process the resolution of the image to be displayed to match the display screen, it is necessary to add redundant pixel columns and redundant pixel rows in the image to be displayed. The redundant pixel rows that need to be added are 10 rows, and the redundant pixel columns that need to be added are 10 columns, that is, 10 rows of redundant pixels and 10 columns of redundant pixels are added. The data in the redundant pixel row and redundant pixel column can be represented by 0. The redundant pixel rows can be added to any display module, or the redundant pixel columns can be added to any display module.

Figure 12:
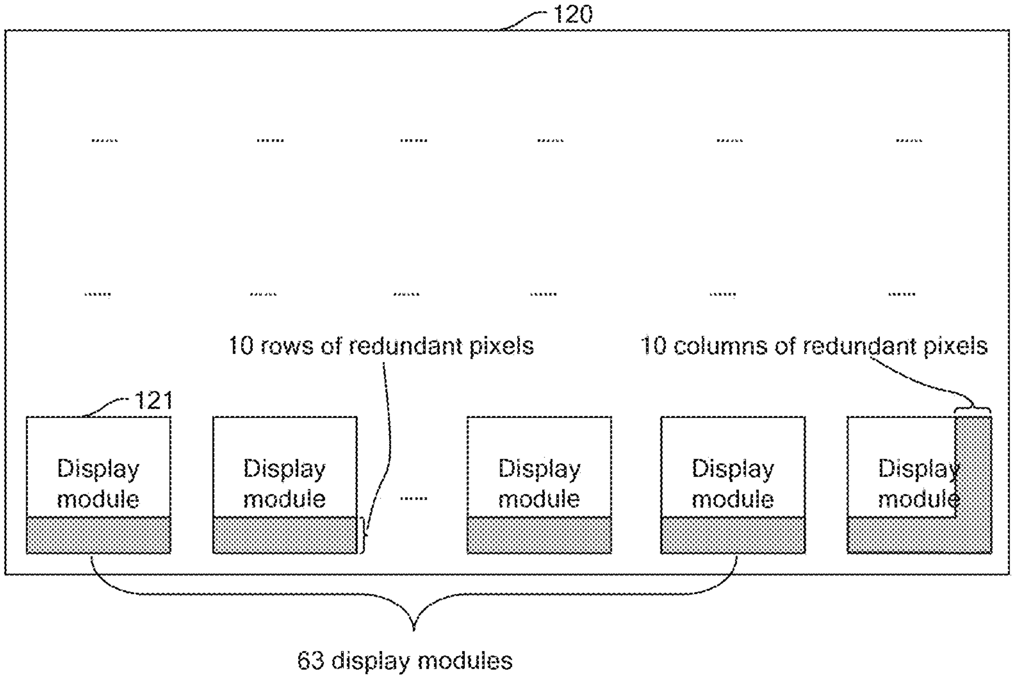
FIG. 12 is a diagram of a redundant pixel row and a redundant pixel column added to the 64 display modules in the last row provided by an embodiment of the present application.

An illustration of adding 10 redundant pixel columns to the display module in the last column and adding 10 redundant pixel rows to the display module in the last row is used for description. FIG. 12 shows a diagram of a redundant pixel row and a redundant pixel column added to the 64 display modules in the last row provided by an embodiment of the present application. The redundant pixel columns and the redundant pixel rows are represented in gray. As shown in FIG. 12, among the 64 display modules in the last row, 10 redundant pixel rows are added to the first 63 display modules, and 10 redundant pixel rows and 10 redundant pixel columns are added to the last display module.

Specifically, the foregoing method of adding redundant pixel rows and the redundant pixel columns is just an illustration, and the redundant pixel rows and the redundant pixel columns can also be added in other ways.

In one embodiment, the display device 100 comprises a plurality of management chips, and each of the plurality of management chips processes a part of the image to be displayed, and parts of the image to be displayed processed by the respective management chips are combined to form the plurality of pixel driving data blocks corresponding to the image to be displayed. This embodiment can be applied to the case where the resolution of the display screen is too high and one management chip cannot meet the demand, and the plurality of management chips can be employed for cascaded processing to achieve full HD and resolutions above full HD.

The plurality of management chips of the display device 100 perform signal synchronization, such as synchronization through a GPIO signal, and the plurality of management chips process the image to be displayed, together.

Figure 13:
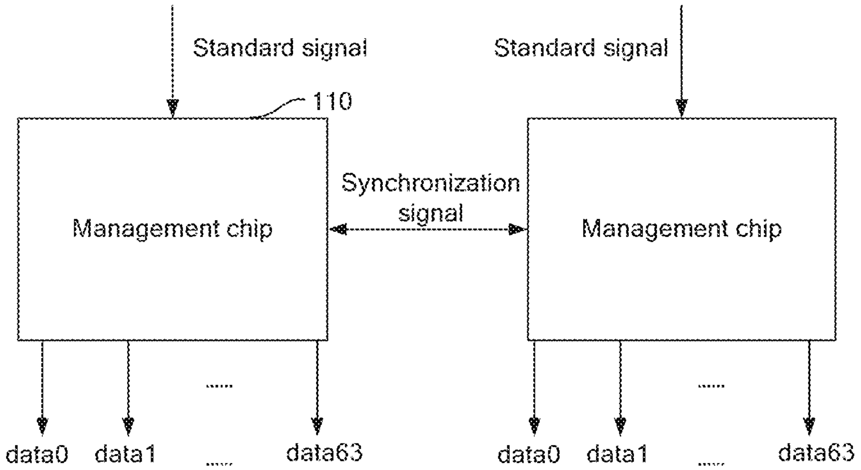
FIG. 13 is a diagram of multiple management chips provided by an embodiment of the present application.

FIG. 13 shows a diagram of multiple management chips provided by an embodiment of the present application. The standard signal is inputted to the plurality of management chips at the same time, and each management chip extracts a part of the image to be displayed in the standard signal for processing, and the plurality of management chips process the entire image to be displayed, together. The connection mode of the data connection lines and the control connection lines for each management chip and the display screen 120 are the same as those described above, and the details are not repeated here.

The embodiment of the present application further provides a display system. The display system comprises a main control chip of generating an image to be displayed and the display device provided by any of the aforesaid embodiments. Specifically, for the content of the display device, please refer to the corresponding description above, which will not be repeated here. The main control chip may be the main control chip corresponding to the device terminal or the signal source terminal, and the image to be displayed is generated by the process of the main control chip.

The embodiment of the present application further provides a distributed function system, comprising: a management chip and a function device, wherein the management chip is connected to the function device through data connection lines, and the function device comprises a plurality of function modules, and each of the function modules is provided with a driving circuit; wherein the management chip is employed to determine initial driving data according to initial driving data corresponding to a function to be implemented, and pack the initial driving data into a plurality of driving data blocks according to parameters of the function modules, and write the driving data blocks to the driving circuits of the corresponding function modules; the driving circuit of the function module is employed to drive function unit in the function module to work according to the driving data block, which is received, wherein a peak value of a processing capability of the driving circuit is greater than or equal to processing parameters required for processing the corresponding driving data block. The function modules comprise display modules, etc.

The distributed function system can pack the initial driving data corresponding to a function to be implemented into a plurality of driving data blocks and cooperate with the function device composed of the plurality of function modules to realize the functions to be implemented together, to realize that each function module processes the corresponding driving data block. Thus, the data transmission bandwidth/data transmission rate of each function module is greatly reduced to improve the data processing capacity of the distributed function system.

Specifically, the distributed function system can be applied not only to the foregoing display devices, but also to audio devices, smart home systems, smart vehicle control systems and aircraft systems. The smart home systems comprise but are not limited to refrigerators, monitors and sofas.

By arranging the display device to comprise a plurality of distributed display modules, each display module receives the corresponding pixel driving data block thereof. Cooperating with the driving circuit of each display module, the pixels in the display module are driven to work according to the received pixel driving data block. The peak value of the processing capability of the driving circuit of the display module is greater than or equal to the processing parameters required for processing the pixel driving data block. Thus, the data transmission bandwidth/data transmission rate of each display module is greatly reduced, to realize full HD and resolutions above full HD of the distributed function system.

The display device, the display system and the distributed function system provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A display device, comprising a management chip and a display screen and a display panel, the management chip and the display screen are disposed on the display panel, wherein the management chip is connected to the display screen through data connection lines, and the display screen comprises a plurality of display circuits and a plurality of first function circuits, and each of the display circuits comprises a plurality of display units, and each of the first function circuits comprises a plurality of first function units, and the plurality of first function units are arranged between adjacent display units, and each of the display circuits is provided with a driving circuit; wherein the management chip is employed to determine initial pixel driving data of an image to be displayed according to the image to be displayed, which is received, and pack the initial pixel driving data into a plurality of pixel driving data blocks according to parameters of the display circuits, and write the pixel driving data blocks to the driving circuits of the corresponding display circuits through the data connection lines based on control signals;

the driving circuit of the display circuits is employed to drive pixels in the display circuits to work according to the pixel driving data block, which is received, wherein a peak value of a processing capability of the driving circuit is greater than or equal to processing parameters required for processing the pixel driving data block;

wherein the management chip comprises a function processing circuit, and the function processing circuit is configured to:

obtain a resolution of the display screen and arrangement parameters of the display circuits before the management chip is employed to determine initial pixel driving data of an image to be displayed according to the image to be displayed, which is received, wherein the resolution of the display screen is determined by resolutions of the display circuits and the arrangement parameters of the display circuits; and under a condition that a resolution of the image to be displayed is higher than the resolution of the display screen, down-sample the image to be displayed so that a resolution of the image to be displayed, which is processed, is same as the resolution of the display screen, or under a condition that a resolution of the image to be displayed is lower than the resolution of the display screen, add redundant pixel rows and/or add redundant pixel columns to the image to be displayed, so that a resolution of the image to be displayed, which is processed, is same as the resolution of the display screen.

2. The display device according to claim 1, wherein a number of pixel driving data blocks is the same as a number of display circuits.

3. The display device according to claim 1, wherein the plurality of display circuits are arranged in an N*M array, and a number of the data connection lines is m correspondingly, and each data connection line is respectively connected to the N display circuits in a corresponding column, where m=M, and M is a positive integer greater than 1, and N is a positive integer greater than 1.

4. The display device according to claim 1, wherein the plurality of display circuits are arranged in an N*M array, and a number of the data connection lines is n correspondingly, and each data connection line is respectively connected to the M display circuits in a corresponding row, where n=N, and M is a positive integer greater than 1, and N is a positive integer greater than 1.

5. The display device according to claim 1, wherein the plurality of display circuits are arranged in an N*M array, and a number of the data connection lines is n*m correspondingly, and each data connection line is respectively connected to the corresponding display circuits, where m=M, n=N, and M is a positive integer greater than 1, and N is a positive integer greater than 1.

6. The display device according to claim 1, wherein the management chip is employed to sequentially write each pixel driving data block to the driving circuit of the corresponding display circuit through the data connection line according to a fixed period.

7. The display device according to claim 6, wherein the management chip further comprises a storage module, and the storage module is employed for storing the pixel driving data blocks corresponding to the respective display circuits when the display circuits display the image to be displayed.

8. The display device according to claim 1, wherein the management chip is employed to write the corresponding pixel driving data blocks to the driving circuits of the corresponding display circuits through the data connection lines when the management chip determines that the respective display circuits start to work.

9. The display device according to claim 1, wherein the control signals are transmitted to a first row of display circuits in a first direction in the display screen through a control connection line, and the first row of display circuits transmits the control signals to other display circuits in a second direction.

10. The display device according to claim 1, wherein the control signals are transmitted to the display screen through the control connection lines, and a number of the control connection lines is the same as a number of the display circuits, and respective control connection lines are connected to the respective display circuits, and the management chip transmits the control signals to the respective display circuits through the corresponding control connection lines.

11. The display device according to claim 1, wherein the display screen comprises a first frequency display area and a second frequency display area, and the management chip is employed to control the display circuits in the first frequency display area to refresh display at a first frequency, and control the display circuits in the second frequency display area to refresh display at a first frequency at a second frequency.

12. The display device according to claim 11, wherein the first frequency display area is arranged around the second frequency display area.

13. The display device according to claim 1, wherein display frequencies of the respective display circuits to refresh display are different.

14. The display device according to claim 1, wherein the management chip is employed to segment the image to be displayed according to arrangement parameters of the display circuits to obtain sub-images to be displayed corresponding to the respective display circuits, and determine sub-initial pixel driving data corresponding to the respective display circuits according to the sub-images to be displayed, and pack the sub-initial pixel driving data into the corresponding pixel driving data blocks.

15. The display device according to claim 1, wherein the management chip is employed to process the image to be displayed according to the resolution of the display screen, the resolutions of the display circuits, and the arrangement parameters of the display circuits, so that the resolution of the image to be displayed matches the resolution of the display screen.

16. The display device according to claim 1, wherein the data connection line comprises a data connection line pair or a single data connection line.

17. The display device according to claim 1, wherein the display device comprises a plurality of management chips, and each of the plurality of management chips processes a part of the image to be displayed, and parts of the image to be displayed processed by the respective management chips are combined to form the plurality of pixel driving data blocks corresponding to the image to be displayed.

18. A display system, comprising a main control chip of generating an image to be displayed and a display device, wherein the display device comprises:

a management chip and a display screen and a display panel, the management chip and the display screen are disposed on the display panel, wherein the management chip is connected to the display screen through data connection lines, and the display screen comprises a plurality of display circuits and a plurality of first function circuits, and each of the display circuits comprises a plurality of display units, and each of the first function circuits comprises a plurality of first function units, and the plurality of first function units are arranged between adjacent display units, and each of the display circuits is provided with a driving circuit; wherein the management chip is employed to determine initial pixel driving data of an image to be displayed according to the image to be displayed, which is received, and pack the initial pixel driving data into a plurality of pixel driving data blocks according to parameters of the display circuits, and write the pixel driving data blocks to the driving circuits of the corresponding display circuits through the data connection lines based on control signals;

the driving circuit of the display circuits is employed to drive pixels in the display circuits to work according to the pixel driving data block, which is received, wherein a peak value of a processing capability of the driving circuit is greater than or equal to processing parameters required for processing the pixel driving data block;

wherein the management chip comprises a function processing circuit, and the function processing circuit is configured to:

obtain a resolution of the display screen and arrangement parameters of the display circuits before the management chip is employed to determine initial pixel driving data of an image to be displayed according to the image to be displayed, which is received, wherein the resolution of the display screen is determined by resolutions of the display circuits and the arrangement parameters of the display circuits; and under a condition that a resolution of the image to be displayed is higher than the resolution of the display screen, down-sample the image to be displayed so that a resolution of the image to be displayed, which is processed, is same as the resolution of the display screen, or under a condition that a resolution of the image to be displayed is lower than the resolution of the display screen, add redundant pixel rows and/or add redundant pixel columns to the image to be displayed, so that a resolution of the image to be displayed, which is processed, is same as the resolution of the display screen.

19. The display system according to claim 18, wherein the plurality of display circuits are arranged in an N*M array;

a number of the data connection lines is m correspondingly, and each data connection line is respectively connected to the N display circuits in a corresponding column, where m=M, and M is a positive integer greater than 1, and N is a positive integer greater than 1; or a number of the data connection lines is n correspondingly, and each data connection line is respectively connected to the M display circuits in a corresponding row, where n=N, and M is a positive integer greater than 1, and N is a positive integer greater than 1; or a number of the data connection lines is n*m correspondingly, and each data connection line is respectively connected to the corresponding display circuits, where m=M, n=N, and M is a positive integer greater than 1, and N is a positive integer greater than 1.

* * * * *